(12) United States Patent
Lange (10) Patent No.: US 6,273,508 B1
(45) Date of Patent: Aug. 14, 2001

(54) INCLINATION ADJUSTMENT FITTING FOR CONSTITUENT AREAS OF MOTOR VEHICLE SEATS

(75) Inventor: Dieter Lange, Petershagen (DE)

(73) Assignee: Faurecia Autositz GmbH & Co. KG, Stadhagen (DE)

( * ) Notice: Subject to any disclaimer, the term of this patent is extended or adjusted under 35 U.S.C. 154(b) by 0 days.

(21) Appl. No.: 09/466,668

(22) Filed: Dec. 20, 1999

(30) Foreign Application Priority Data

Dec. 22, 1998 (DE) .............................................. 198 59 239

(51) Int. Cl.⁷ .................................. B60N 2/20; B60N 2/22
(52) U.S. Cl. ........................ 297/378.12; 297/367; 297/366
(58) Field of Search ..................................... 297/366, 367, 297/378.12

(56) References Cited

U.S. PATENT DOCUMENTS

| | | | |
|---|---|---|---|
| 5,138,744 | * 8/1992 | Coggon | 297/367 X |
| 5,150,635 | * 9/1992 | Hein | 297/367 X |
| 5,156,439 | * 10/1992 | Idlani et al. | 297/367 |
| 5,522,643 | * 6/1996 | Matsuura | 297/367 |
| 5,590,932 | * 1/1997 | Olivieri | 297/367 |
| 5,718,481 | * 2/1998 | Robinson | 297/367 |
| 5,733,008 | * 3/1998 | Tame | 297/367 X |
| 5,788,330 | * 8/1998 | Ryan | 297/367 X |
| 5,813,725 | * 9/1998 | Robinson | 297/367 |

FOREIGN PATENT DOCUMENTS 197 09 524   9/1998   (DE) .

\* cited by examiner

*Primary Examiner*—Peter M. Cuomo
*Assistant Examiner*—Rodney B. White
(74) *Attorney, Agent, or Firm*—Connoly Bove Lodge & Hutz (57) ABSTRACT

An inclination adjustment fitting for constituent areas of motor vehicle seats, such as backrests, for example, has a first fitting portion and a second fitting portion. The first fitting portion connected to a first constituent area, and the second fitting portion is connected to a second constituent area. For locking in a desired position of inclination, sets of gear toothing, which mesh with one another, are provided at either portion of the fitting. The sets of gear toothing which mesh to effect the locking are both not provided directly on the portion of the fitting that supports them, but rather, on an intervening element, which is movable, within limits, relative to the corresponding portion of the fitting. The transfer of forces and motion from an individual fitting portion of the fitting to the intervening element occurs by way of a relatively coarse toothed coupling, while the intervening element has another, finer gear toothing which meshes with the opposing gear toothing of the other fitting portion.

8 Claims, 8 Drawing Sheets

INCLINATION ADJUSTMENT FITTING FOR CONSTITUENT AREAS OF MOTOR VEHICLE SEATS

BACKGROUND OF THE INVENTION

The invention relates to an inclination adjustment fitting for constituent areas of motor vehicle seats, such as backrests, for example.

In a known inclination adjustment fitting of this kind as described, for example, in DE 197 09 524A1, a first fitting portion is formed by means of a tooth segment that is connected, in rigid fashion, with the backrest. The second portion of the fitting is an arresting catch whose gear toothing may be pivoted into or out of engagement with the gear toothing of the tooth segment. The arresting catch is held in the engagement position by means of a locking catch, which is also capable of being pivoted.

The arresting catch is equipped with a constricted area of diminished width between its axis of pivot and the area of contact of the locking catch, which lies opposite the gear toothing. This constriction serves the purpose of securely retaining the locking position between the meshing teeth, in the case of an elastic deformation such as that which occurs in particular in the case of pulsing stresses.

Retention of the locking effect between the tooth segment and the arresting catch represents a fundamental problem that is difficult to resolve, particularly in conjunction with the stresses of a crash. In the case of a crash, slippage of the gear toothing, and thus, suspension of the blocking effect, can occur.

SUMMARY OF THE INVENTION

In view of the foregoing deficiencies in the prior art it is an object of the invention to embody an inclination adjustment fitting such that slippage of the sets of gear toothing that mesh with one another is avoided, even in the case of high stresses associated with a crash. It is a further object to obtain a better fixation even if, when a crash occurs, a tangential shift of the sets of gear toothing that mesh with one another occurs, even if the corresponding deformation is no longer elastic, but rather, plastic.

An inclination adjustment fitting according to the present invention provides an intervening element which has both a finer and a coarser gear toothing, to permit more pronounced shifting, in a tangential direction, of the parts that work together than is possible in the case of a direct engagement between the arresting toothing of an arresting catch and the opposing toothing of the segment firmly attached to the backrest. The movability of the intervening element in a tangential direction holds the sets of gear toothing that work together in mesh across an enlarged pathway of deformation.

BRIEF DESCRIPTION OF THE DRAWINGS

The inclination adjust fittings depicted and described are provided for the adjustment of the inclination of backrests.

DESCRIPTION OF THE PREFERRED EMBODIMENTS

In the various embodiments, identical parts, or parts that correspond to one another are given the same reference symbols in each case. When necessary, the reference symbols of the various embodiments are distinguished from one another by means of superscript prime symbols.

Figure 1:
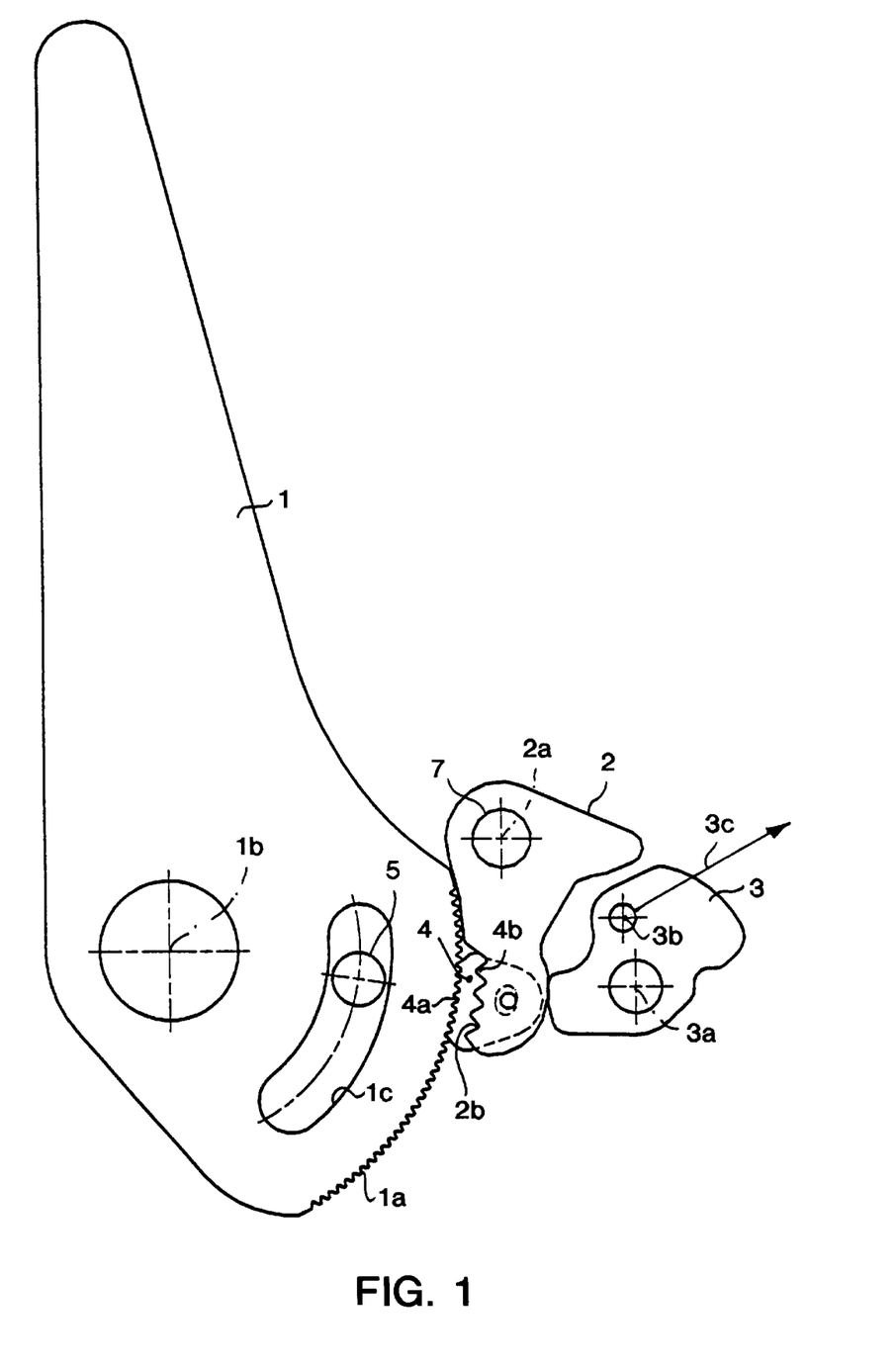
FIG. 1 shows a schematic representation of parts of a first embodiment in a normal locking state.
Figure 2:
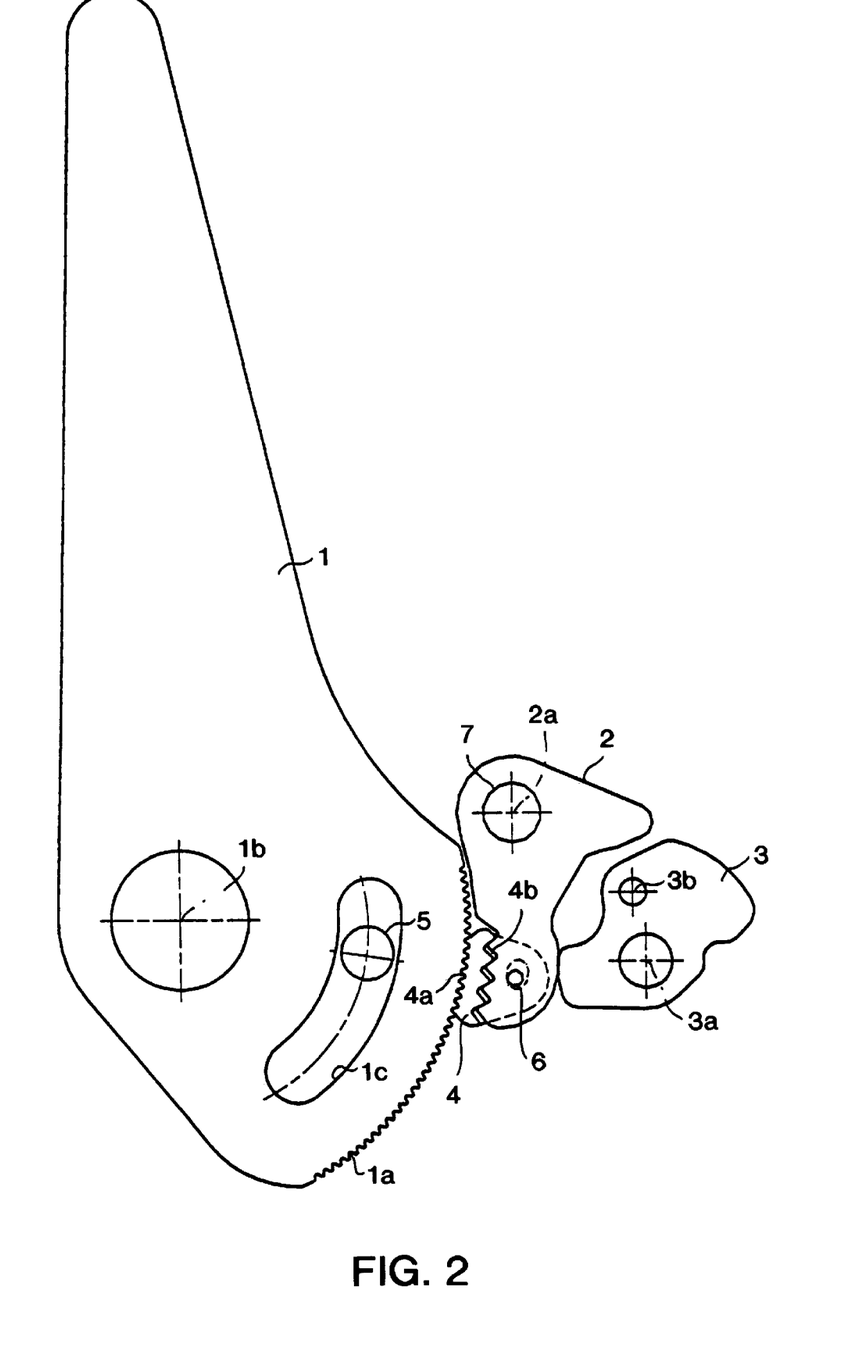
FIG. 2 shows the embodiment according to FIG. 1, wherein a second fitting portion is shifted, and the opposing gear toothing.
Figure 3:
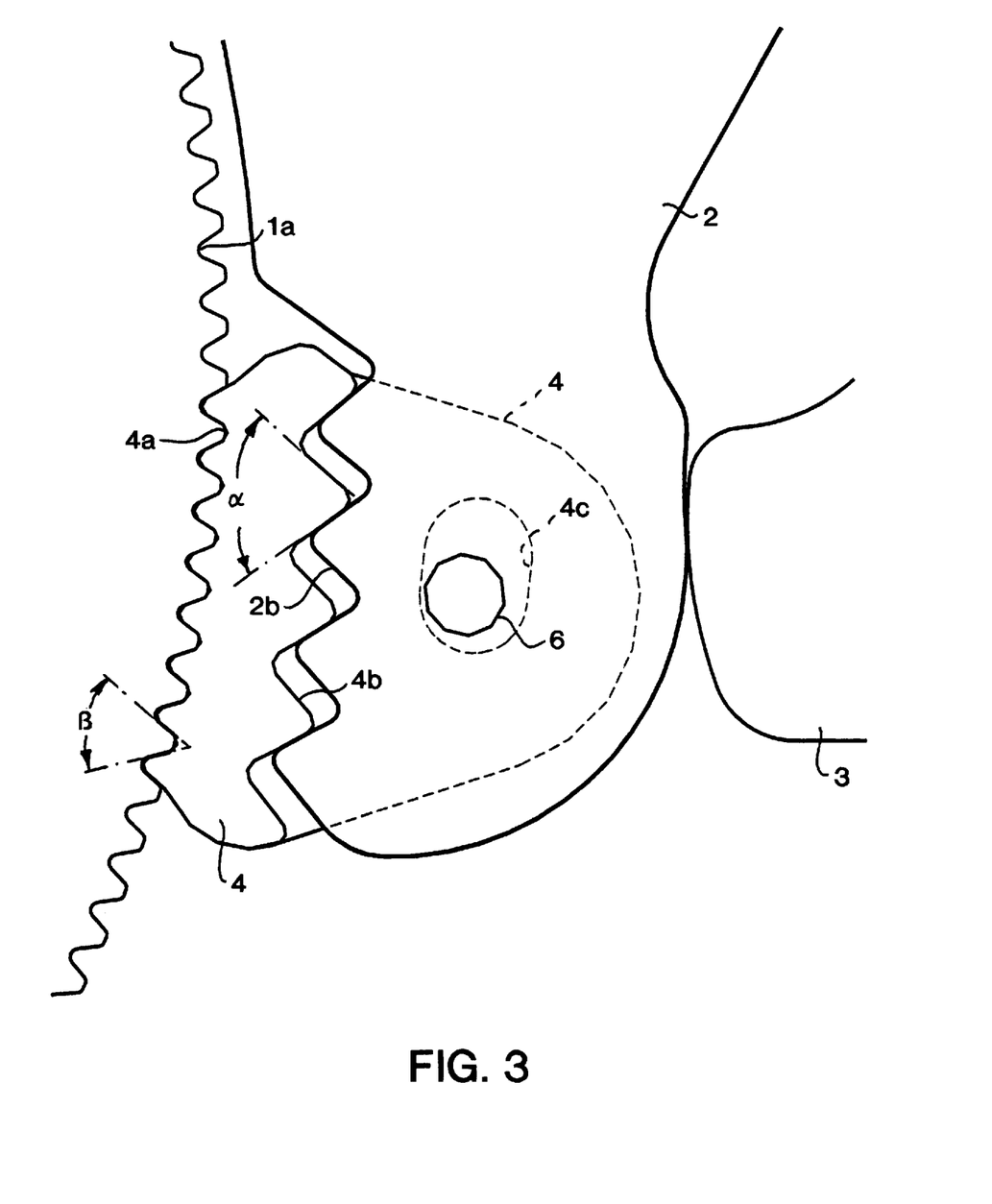
FIG. 3 shows an enlarged representation of a portion of FIG. 2, in which, in particular, the position of the intervening element is clearly visible.

Referring now to FIGS. 1–3, a first fitting part 1 is embodied as a gear tooth segment, and is firmly connected to a backrest, which is not depicted. The first fitting part 1 may be pivoted, together with the backrest, around the axis of pivot 1b. The pathway of pivot is limited by means of an interaction of an arched groove 1c with a contact bolt 5. The gear toothing of the first fitting part 1 comprises opposing gear toothing 1a meshing with a second gear toothing 4a of an intervening element 4. The intervening element 4 is attached to a second fitting portion 2. To this end, a mandrel 6 feeds through a suitable acceptance bore-hole of the second fitting portion 2 and a longitudinal hole 4c of the intervening element 4. The second fitting portion 2 is mounted, so as to be capable of rotating, around an axis 2a on a bearing bolt 7 that is affixed to the seat portion. The second fitting portion 2 has an intervening toothing 2b that is oriented in the direction of the opposing gear toothing 1a. This intervening toothing is meshed with a first set of gear toothing 4b of the intervening element 4.

The intervening gear toothing 2b and the first toothing 4b are coarser than the opposing gear toothing 1a and the second gear toothing 4a, which meshes with it. An angle α of the intervening toothing 2b as well as that of the first gear toothing 4b is preferably approximately 75°.

An angle β of the opposing gear toothing 1a as well as of the second toothing 4a is preferably approximately 55°.

An extent of the longitudinal hole 4c is parallel to a direction which is tangential to the opposing gear toothing 1a or 2b. This permits the intervening element to move in a tangential direction without slippage of the intervening gear toothing 2b out of the first gear toothing 4b.

Conditions in the shifted state are readily apparent from FIG. 3. The opposing gear toothing 1a and the second gear toothing 4a of the intervening element mesh with one another; that is unchanged. The second fitting portion 2 has migrated from the first central position, in which the mandrel 6 is provided in the center of the longitudinal hole 4c into a position that has shifted upward and to the right. In spite of a relatively great movement, the form-fitting connection between the second fitting portion 2 and the intervening element 4 is not disrupted, so that the inclination is not changed.

The second fitting portion 2 and the intervening element 4 are held in the locking position by means of a locking catch 3, which is seated so that it may be pivoted around a horizontal axis 3a on the seat portion. The locking catch 3 is drawn in the direction of the arrow 3c under the effect of a tension spring, not shown, by means of an activating rod, also not shown, which is attached in an articulated fashion at the bore-hole 3b. For the purpose of unlocking, the activating rod is pressed in the opposite direction relative to the arrow 3c, overcoming the force of the spring in the process.

A second embodiment is shown in FIGS. 4–6b. The basic structure of the second embodiment according to FIGS. 4 through 6b, corresponds to that of the first embodiment. Only the second fitting part 2' and the intervening element 4' diverge from the first embodiment. In the case of the second embodiment, the intervening element 4' is mounted on bearing bolt 7 by means of a longitudinal hole 4'c, the longitudinal extent of which runs substantially parallel to a direction which is tangential to the opposing gear toothing 1a, so that the intervening element 4' is capable of pivoting around the axis of pivot 2a and so that it is capable of being shifted in the longitudinal direction of the longitudinal hole 4'c. In the case of this embodiment, the second fitting portion 2' has an intervening toothing 2'b, which is oriented in the direction of the opposing toothing 1a. This intervening toothing 2'b meshes with first toothing 4'b of the intervening element 4'. A second toothing 4'a is provided on the intervening element 4', approximately parallel to the first toothing 4'b, which second toothing meshes with the opposing gear toothing 1a. The intervening toothing 2'b and the first gear toothing 4'b are coarser than the opposing toothing 1a and the second toothing 4' a of the intervening element, which meshes with it.

Figure 4:
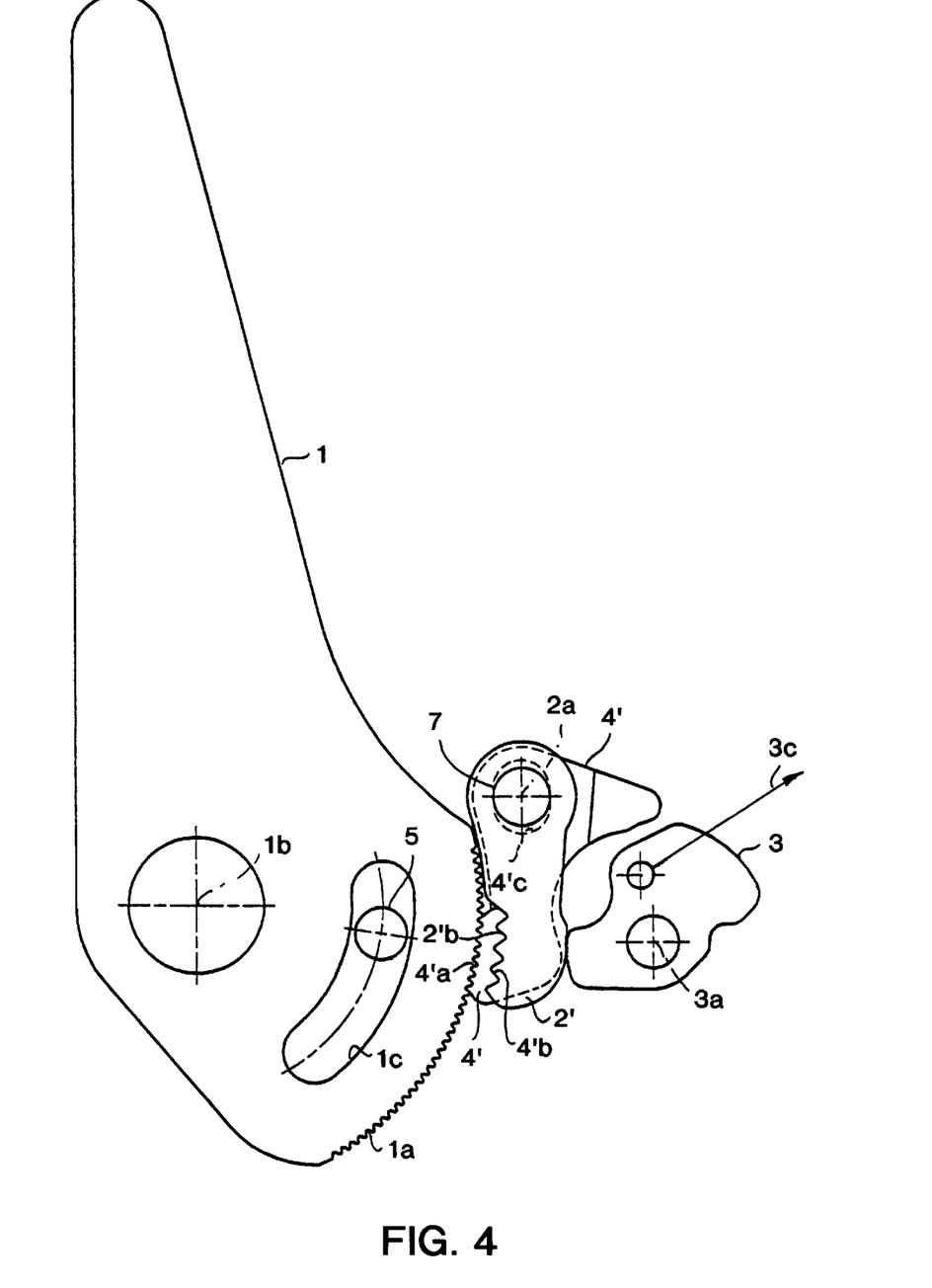
FIG. 4 shows a representation of a second embodiment that is analogous to FIG. 1.
Figure 5:
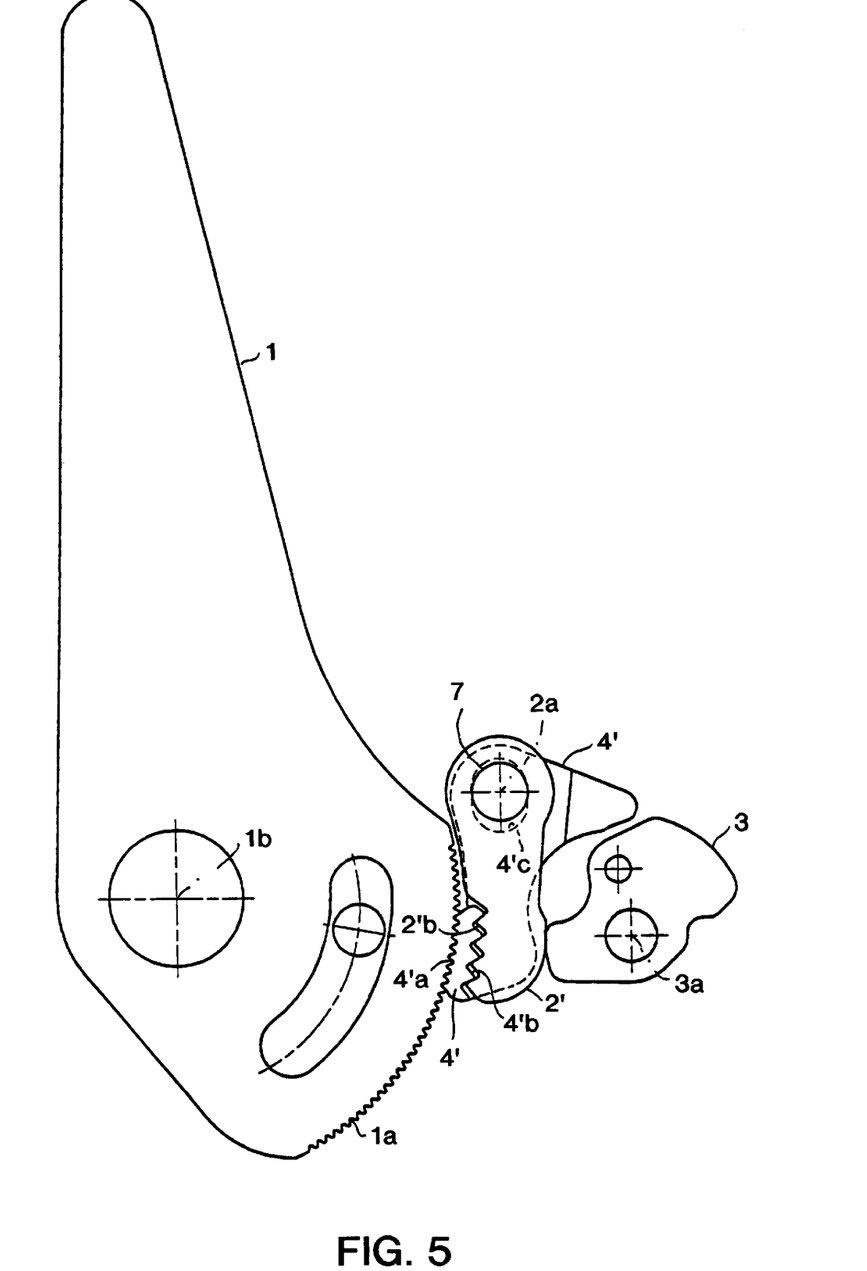
FIG. 5 shows a representation of the second embodiment that is analogous to FIG. 2.
Figure 6A:
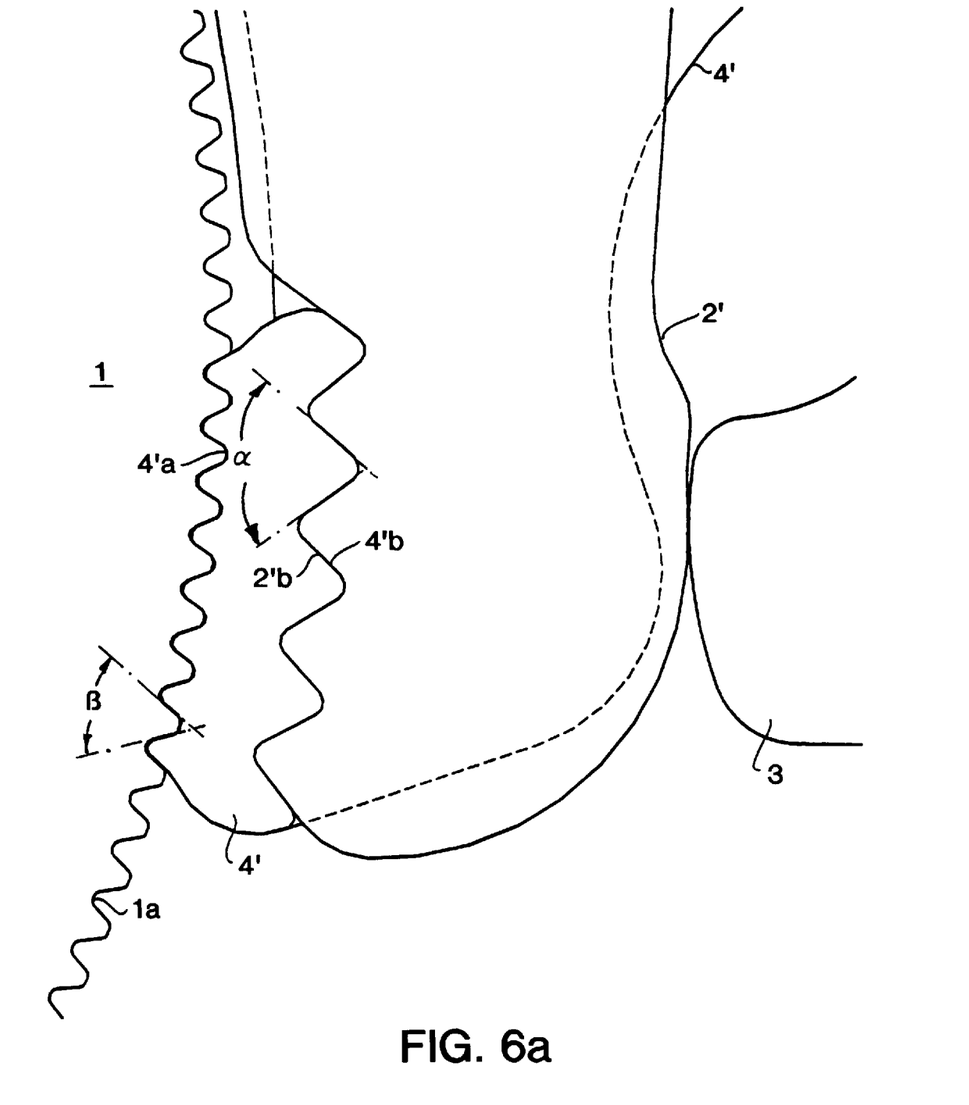
FIG. 6a shows an enlarged representation of the determinant gear toothed areas of the second embodiment, in a state of normal engagement.
Figure 6B:
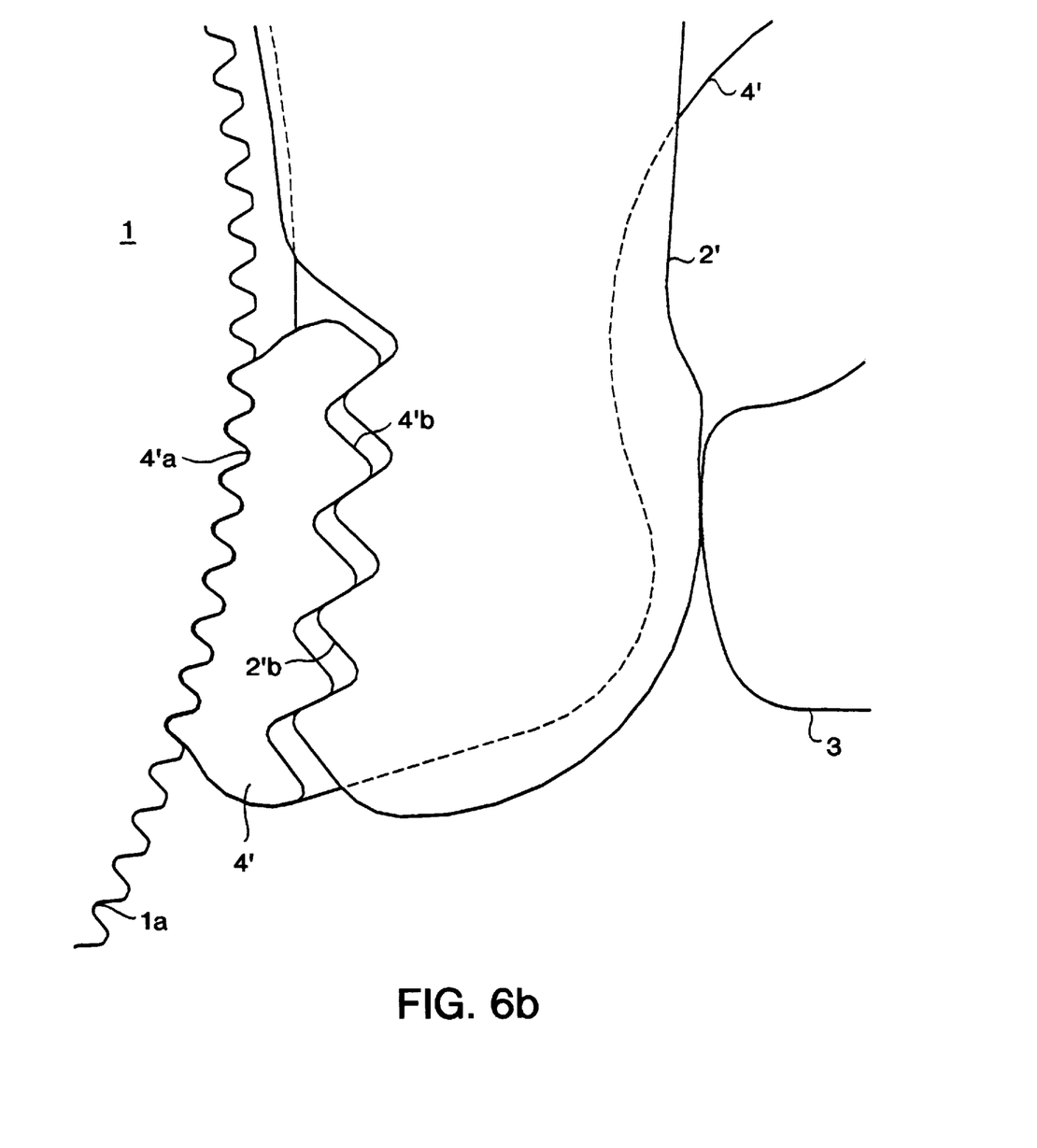
FIG. 6b shows a representation of the second embodiment that is analogous to FIG. 3.

The toothing of the second embodiment is practically identical to that of the first embodiment, as is apparent from a comparison of FIGS. 3 and 6b. In FIG. 6a, the meshing conditions of FIG. 4 are depicted in a magnified state; in FIG. 6b, the enlarged representation depicts a shift between the intervening toothing 2'b and the first gear toothing 4'b of the intervening element 4.

Figure 7:
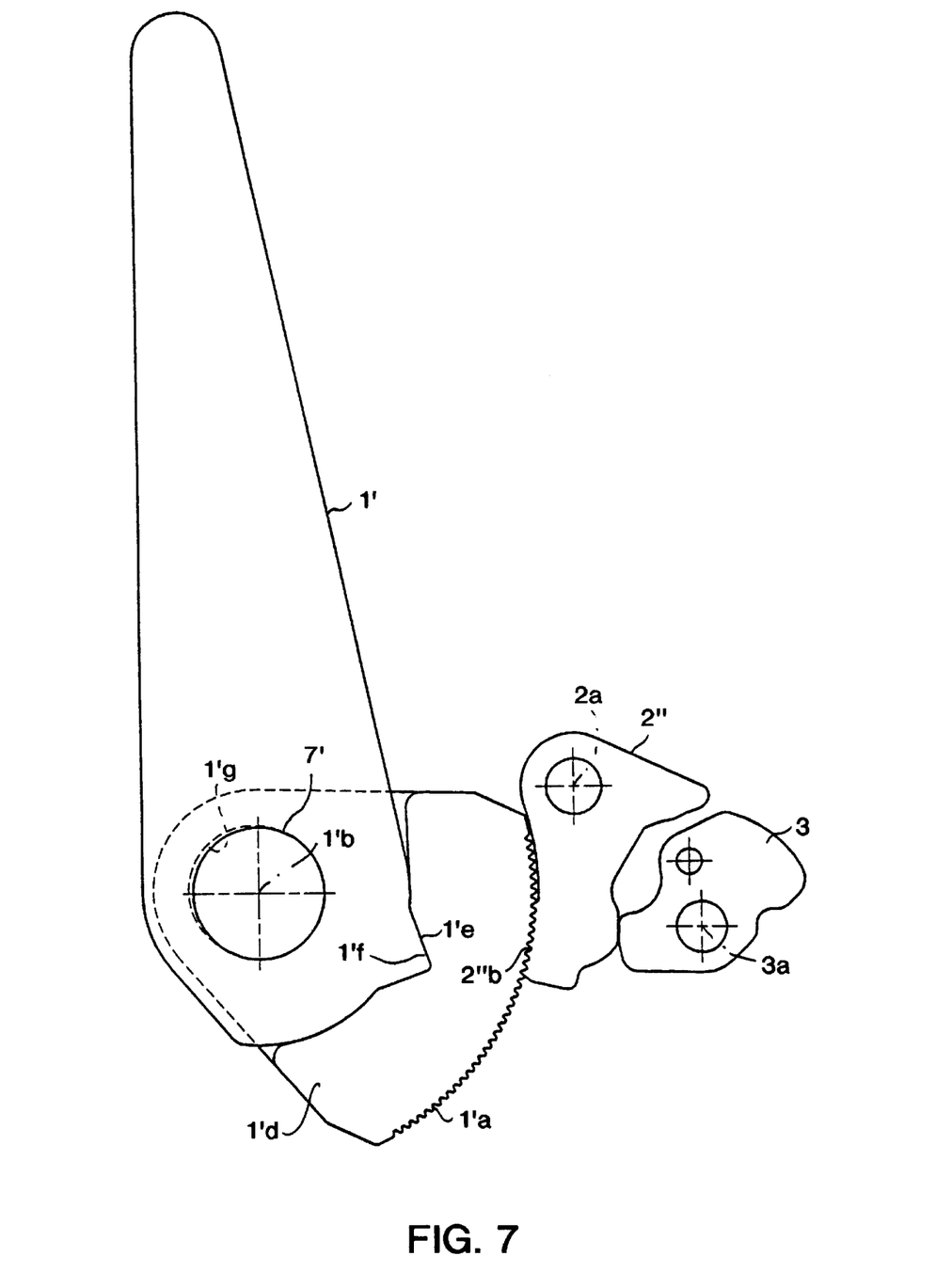
FIG. 7 shows a representation of a third embodiment that is analogous to FIGS. 1 and 4.

FIG. 7 shows a third embodiment, which substantially represents a kinematic reversal of the first two embodiment: the case of the third embodiment, a part 1' firmly connected to the backrest and may be pivoted, together with the backrest, around an axis of inclination 1'b, which represents the center of a bolt 7'. Furthermore, an intervening element 1'd is seated upon the bolt 7', which intervening element has opposing toothing 1'e, which points toward the second fitting part 2'. The second fitting part 2" is an arresting catch with gear toothing 2"b that may be pivoted around the axis 2a. The toothing 2"b that is provided on the second fitting part 2" can be brought into or out of mesh with the opposing gear toothing 1'a by pivoting the second fitting portion 2". In order to effect a release, the locking catch 3 must first be pivoted from its fixing position, which is depicted. Activation of the locking catch 3 occurs in a manner identical to that of the first two embodiments that are described.

The intervening element 1'd has, on its back, a markedly coarser toothing than that formed by the opposing toothing 1'a. The coarser toothing is formed, in the embodiment that is depicted, by a single space width 1'f into which a single tooth 1'e of the part 1', which is firmly attached to the backrest, meshes. As a result of the provision of a longitudinal hole 1'g, the longitudinal extent of which runs radial to the toothing formed by space width 1'e and tooth 1'f, a motion that is both radial and tangential is possible between part 1' and the intervening element 1'd in the area of the gear toothing that lies opposite the opposing toothing 1'a without slippage of the intervening element ltd relative to the part 1', which is firmly attached to the backrest.

The invention claimed is:

1. An inclination adjustment fitting for constituent areas of motor vehicle seats, comprising:
    a first fitting portion connected to a first constituent area and being pivotable about a first axis, said first fitting portion having an opposing gear toothing;
    a second fitting portion connected to a second constituent area and being pivotable about a second axis parallel to said first axis;
    said second fitting portion being held in an arrested position in which said second fitting portion meshes with said opposing gear toothing by means of a locking catch;
    wherein:
        said second fitting portion includes an intervening gear toothing which meshes with a first gear toothing of an intervening element which may be brought into and out of engagement with said opposing gear toothing by means of a second gear toothing;
        said second gear toothing being finer than said first gear toothing; and
        said intervening element being shiftable in a direction which is tangential to said first gear toothing.

2. The inclination adjustment fitting of claim 1, wherein said intervening element is shiftably mounted to said second fitting portion by means of a connecting bolt and a longitudinal hole in said intervening element.

3. The inclination adjustment fitting of claim 1, wherein said intervening element is pivotably mounted on a bearing bolt for the second fitting portion, so as to be shiftable by means of a longitudinal hole in said intervening element.

4. The inclination adjustment fitting of claim 1, wherein:
    an angle α of said intervening gear toothing and said first gear toothing of said intervening element is greater than an angle β of said second gear toothing and said opposing toothing of said first fitting portion.

5. The inclination adjustment fitting of claim 4, wherein: said angle α is approximately 75° and said angle β is approximately 55°.

6. The inclination adjustment fitting of claim 5, wherein said intervening element is mounted elastically so as to be shiftable in a direction which is tangential to said first gear toothing.

7. An inclination adjustment fitting for constituent areas of motor vehicle seats, comprising:
    a first fitting portion connected to a first constituent area and being pivotable about a first axis, said first fitting portion having an opposing gear toothing;
    a second fitting portion connected to a second constituent area and being pivotable about a second axis parallel to said first axis, said second fitting portion having second gear toothing;
    said second fitting portion being held in an arrested position in which said second gear toothing meshes with said opposing gear toothing by means of a locking catch;
    wherein:
        said opposing gear toothing is provided on an intervening element, said intervening element further having a coarse gear toothing which meshes with a corresponding coarse gear toothing at a fixed portion of said first fitting portion which is connected to said first constituent area;
        said intervening element being shiftable relative to said fixed portion in a direction which is tangential to said coarse gear toothing.

8. The inclination adjustment fitting of claim 7, wherein said intervening element is connected with said fixed portion by means of a longitudinal hole which is oriented in a direction radial to said coarse gear toothing, and a bolt that feeds through the longitudinal hole.

* * * * *

UNITED STATES PATENT AND TRADEMARK OFFICE
CERTIFICATE OF CORRECTION

PATENT NO. : 6,273,508 B1 Page 1 of 1
DATED : August 14, 2001
INVENTOR(S) : Dieter Lange It is certified that error appears in the above-identified patent and that said Letters Patent is hereby corrected as shown below:

<u>Title page,</u>
Item [73], Assignee, should read:

-- Faurecia Autositze GmbH& Co. KG, Stadthagen (DE) --.

Signed and Sealed this

Eighteenth Day of June, 2002

Attest:

Attesting Officer

JAMES E. ROGAN
*Director of the United States Patent and Trademark Office*